Oct. 7, 1924.
P. S. WILCOX
DESTRUCTIVE DISTILLATION PROCESS
Filed May 4, 1922
1,510,730
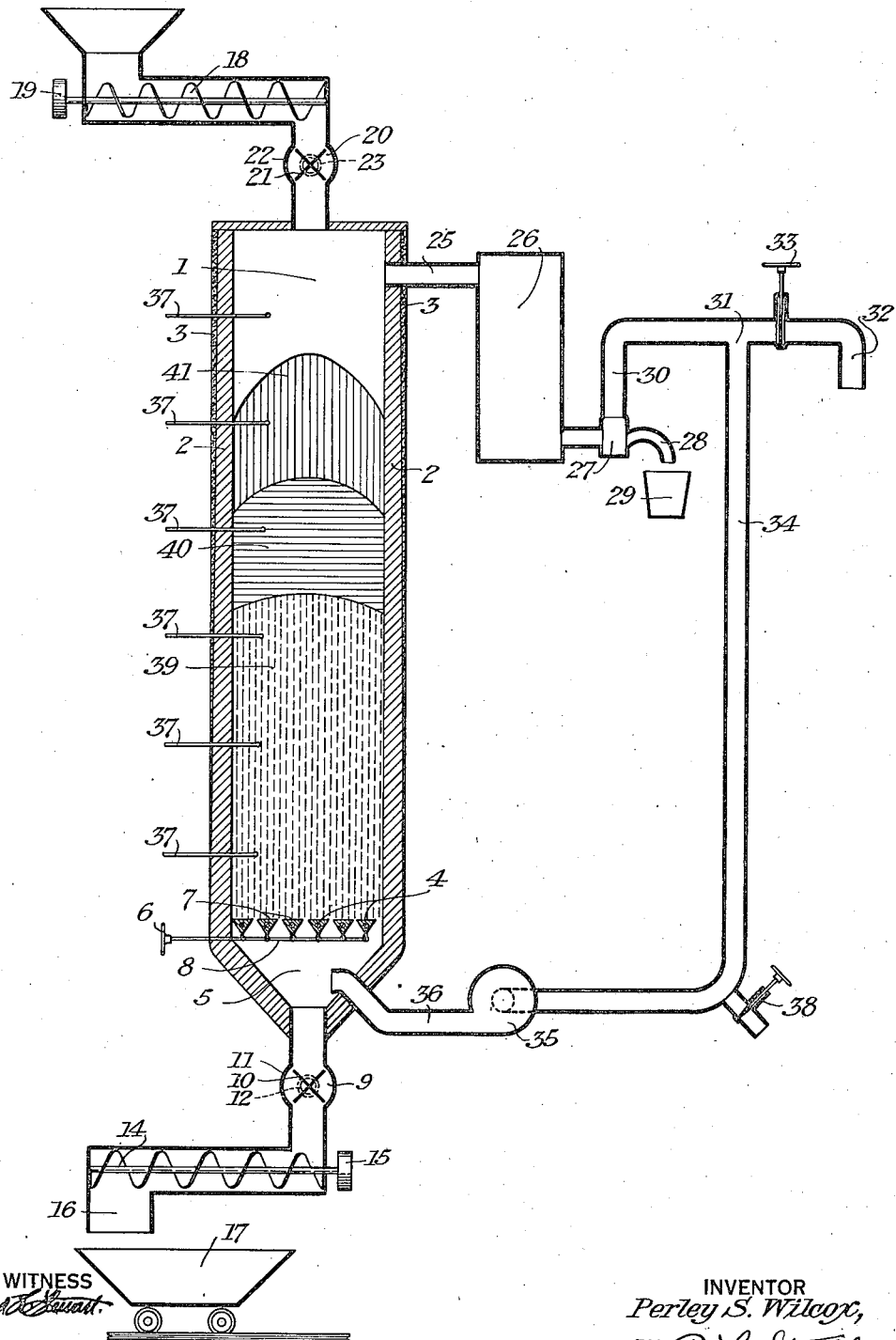
WITNESS
INVENTOR
Perley S. Wilcox,
BY R. L. Stinchfield
ATTORNEY Patented Oct. 7, 1924.

1,510,730

UNITED STATES PATENT OFFICE.

PERLEY S. WILCOX, OF KINGSPORT, TENNESSEE, ASSIGNOR TO EASTMAN KODAK COMPANY, OF ROCHESTER, NEW YORK, A CORPORATION OF NEW YORK.

DESTRUCTIVE-DISTILLATION PROCESS.

Application filed May 4, 1922. Serial No. 558,520.

*To all whom it may concern:*

Be it known that I, PERLEY S. WILCOX, a citizen of the United States of America, residing at Kingsport, in the county of Sullivan and State of Tennessee, have invented certain new and useful Improvements in Destructive-Distillation Processes, of which the following is a full, clear, and exact specification.

This invention relates to the destructive distillation of wood or equivalent material, and particularly to such a process in which material is added to the reaction mass during distillation and in which the amount of air present in the reaction mass is reduced to a minimum.

Among the objects of my invention are: to regulate the temperature of the distillation reaction zone so that products, such as wood alcohol and acetic acid, may be increased; to make steadier the distillation reaction so as to lessen or prevent undesirable surges or rushes of the distillation reaction; to bring uncondensed gases from the distillation back into contact with the material undergoing the reaction, in order to increase the alcohol and acetic acid; to evenly distribute, by means of inert or uncondensed gases, the necessary heat in all parts of the charge or reaction mass, thereby preventing the presence of untreated or partially treated material at the end of the process; to sweep out, by a current of gas, the gases or vapors evolved by the distillation, so that they will be carried rapidly to the condensor without danger of breaking down the alcohol and acetic acid by prolonged exposure to the higher temperatures; to remove heat from the charcoal and carry it to the reaction zone by a current of inert or uncondensed gas, thus increasing the thermal efficiency of the process and providing for the temporary handling of an excess of wood under treatment,—in other words, greater latitude in carrying out the process; to provide for properly heating the material added to the reaction mass, even when such material has some moisture and a fairly low temperature; to lower the temperature of the charcoal by means of an inert or uncondensed gas, so that it may be safely taken to the air without danger of ignition or excessive oxidation; to treat the charcoal with a gas rich in carbon dioxide which may be partially adsorbed in the charcoal, so as to render the latter more stable; and to control the retention of volatile matter within limits. Other objects will hereinafter appear.

In the accompanying drawing the single figure is a diagrammatic representation of an apparatus in which my process may be carried out, certain parts being shown in section and the relative proportions being exaggerated for the sake of clearness.

The retort 1, in which the reaction takes place, may comprise a wall 2 of insulating brick coated on the outside by a further heat insulating layer 3 which may vary in thickness in accordance with the need for insulation at different parts of the retort. At the bottom of the retort is a grate 4 of any suitable or preferred form by means of which the completed solid material may be dropped into the space 5, said grate being operated by any suitable means 6. In the drawing we have conventionally indicated pivoted triangular grate bars 7 rotated in unison by means of a rod 8 pivotally connected to arms on the shafts of said grate bars in the well known way.

The space 5, which may taper downwardly, leads into a rotary discharge valve 9 of any suitable design, having for example vanes 10 turning within a casing 11, and being driven by a pulley 12 or other suitable means from a source of power (not shown). This construction tends to minimize the discharge of gas with the raw material. The material passed by the discharge valve 9 enters a screw conveyor 14 driven by a pulley or other source of power 15 and is then discharged through the opening 16 into the air or into any suitable temporary or permanent receptacle, indicated conventionally at 17 in the drawing. The conveyor 14 is driven in suitable timed relation to the valve 9, so as to carry away all the material passed by the latter.

At the top of the retort there is a screw conveyor 18 driven from a pulley 19 or other suitable source of power which carries the wood or analogous material to be treated to a feed valve 20 of any suitable design, having, for instance, vanes 21 turning within walls 22, and being driven by a pulley 23 or other source of power. The feed of the screw conveyor and the feed of the valve 20 are coordinated so that an excess of wood will not be delivered to the valve.

Leading from the top of the retort 1 is a pipe 25 through which I discharge the gases and vapors, hereinafter referred to as gases for convenience. The gases enter any suitable condenser 26. If desired this may include a scrubber for the gas. The liquids condensed from the gas enter the receptacle 27 from which they are conducted by the curved spout or trap 28 to any suitable receptacle 29. The cooled uncondensed gases then pass up the pipe 30 to the T connection 31 where part of them may be discharged through the pipe 32 and valve 33; but a considerable portion of them pass into the pipe 34, from which they are drawn by a fan 35 and blown through pipe 36 into the retort, preferably but not necessarily into space 5 below the grate 4. The temperatures within the apparatus may be conveniently indicated by a series of thermometers 37.

It will be understood that my process is not restricted to use in any particular form or dimension of apparatus, and that the above showing is purely illustrative of one structure in which the steps of my process may be conveniently carried out. While the feed valve 20 and discharge valve 9 are convenient means to minimize the discharge of gas into and out of the retort with the solid material, nevertheless they are not indispensable,—in fact, if they be omitted, the screw conveyors 14 and 18 usefully prevent the entrance of air.

In carrying out my process in the illustrated apparatus, wood or equivalent material, preferably in the form of small blocks or chips, is fed through conveyor 18 and valve 20 into the retort 1 on grate 4 and there set on fire, merely as a starting means. If necessary, air can be drawn into pipe 34 through valve 38, but the air within the retort is generally sufficient. As soon as the small preliminary charge of wood reaches the proper temperature, all air supply is cut off and wood chips are fed on to the heated mass by means of conveyor 18 and valve 20. With the air supply substantially cut off, ordinary combustion ceases, but the destructive distillation proceeds, due to the heat developed by exothermic carbonization or pyrolysis. After the process thus enters into the true distillation stage in the absence of substantial amounts of air, the material in the retort becomes located roughly within three zones. At the bottom is the charcoal zone 39, where the solid product of the reaction is collected and separated. Above the charcoal zone is the main reaction zone 40, in which the exothermic distillation takes place, charcoal being formed and gaseous products, including wood alcohol and acetic acid being given off. Above the distillation zone is the zone 41 of heated wood, where the temperature of the raw material is gradually brought up to the reaction temperature, so that the exothermic reaction will suitably propagate through it.

Distillation may be initiated just above the grate 4 and then the reaction mass may be built up vertically by feeding in wood, the zone of distillation moving vertically upward in the retort, leaving behind it an ever increasing collection of charcoal and having above it a zone of heated wood. But in the commercial operation of my process I prefer to make the distillation a substantially continuous one, part of the collected charcoal being removed through grate 4, space 5, valve 9, and conveyor 14. This lowers the whole charge in the retort, the raw material being supplied by conveyor 18 and valve 20 roughly in accordance with the removal of the charcoal. In this way the charcoal collection zone, the exothermic reaction or distillation zone, and the wood heating zone may all be kept fairly stationary within the retort, the downward flow of material being approximately equal to the rate at which the exothermic pyrolysis is propagated upwardly.

The gases from the distillation are treated in condensor 26, where the condensable portions are collected and finally discharged through receptacle 27 and spout 28. The uncondensed gases, which may be rich in carbon dioxide and even contain around 40% of this gas, are then drawn, or at least a considerable fraction of them, through pipe 34 and then blown through pipe 36 beneath the grate 4. Their temperature will, in the preferred form of my process, be lower than the temperature at which the exothermic reaction is carried on. Preferably the temperature of the gases is reduced below the point at which charcoal will ignite in the air. The uncondensed gases thus used may, in fact, be reduced to below 150° F. The temperature of the gases may also be varied in accordance with the rate at which they are blown through pipe 36.

The inert or uncondensed gases, which, as above stated, may be rich in carbon dioxide, are evenly distributed by the grate 4 and pass upwardly through the charcoal collecting zone 39. As they pass higher and higher in this zone, they become hotter and hotter, while the charcoal is cooled down and in addition to the cooling effect, there is an absorption of gases, like carbon dioxide for example, by the porous charcoal. When the charcoal is ready to be removed from the apparatus to the air by the described mechanism, it is in such condition, by reason of said gas treatment, that it has little, if any tendency to ignite, and subsequent oxidation is minimized. In other words this conditioned charcoal is substantially below its ignition temperature.

The gases heated in the charcoal collection zone then enter the reaction zone 40. While these gases are hot, I prefer to so regulate their temperature and volume, as they leave pipe 36, that they are below the principal reaction temperature in the zone 40. As they pass through such zone, they are further heated, but their somewhat cooling effect regulates any tendency of the temperature to become unduly great in this zone. In other words, by blowing various volumes of gas through at different rates and temperatures, the reaction temperature of the distillation zone comes under control. The effect can, of course, be observed in the thermometers 37. Generally the reaction temperature range is below a red heat, but above 280° C. It may even be kept below 650° C. under some circumstances. The exact temperature will vary according to the specific dimensions and construction of the retort, as will be understood by those skilled in the art. As a result of this control, the tendency of the reaction to burst out very rapidly in a quick surge, followed by an undesirable sluggish period, can be minimized or avoided entirely. By preventing too high a temperature in the reaction zone, the production of wood alcohol and acetic acid can be materially increased. The uncondensed gases which thus enter the heat reaction zone also contain reactive material, and chemical combinations take place which increase the desired yield of alcohol and acid. Due to the even distribution of the gases rising up through grate 4 and charcoal zone 39, the heat in those gases is distributed throughout the zone 40. Therefore, as the gases are brought to the reaction temperature within the zone 40, they meet with every particle of wood therein, so that untreated or partially treated pieces of wood cannot occur. This makes a more uniform charcoal which is easier to grade and use.

The walls of the retort are so constructed that the loss of heat through them is very small, in fact, negligible. My process, however, permits of an increased latitude in the matter of heat insulation. The rising gases abstract the heat from the charcoal which would otherwise be lost, and thus make it easier to maintain the proper temperature within the upper zones of the retort. In other words, by bringing in heat from the charcoal, less attention need be paid to preventing loss by conduction through the walls of the retort. The uncondensed gases which have swept through the charcoal and reaction zones rapidly sweep out the gases given off in the latter zone and carry them so quickly through the pipe 25 to the condenser 26 that the chance of lessening the wood alcohol and acetic acid is diminished.

The hot stream of gases from the distillation zone heats up the pieces of wood or chips in zone 41, these chips becoming warmer and warmer as they progress toward the zone 40 in which the distillation reaction is propagated. By carrying these gases upward with certainty into this wood heating zone, I am enabled to introduce the wood through conveyor 18 and valve 20 with a fair amount of moisture and in a somewhat cooled condition. For example, the incoming wood may be reduced to a moisture content of only 4 or 5% before being used in my method, instead of being dried to below 1% of moisture. The hot gases flowing rapidly through the wood in zone 41 prevent any cool or sluggish areas, and, moreover, will take care of any temporary excess of wood which may be inadvertently fed to the retort. In other words, a greater latitude is possible in carrying out the process, the operator not being forced to maintain a strict relation between the amount of wood fed by conveyor 18 and the amount of charcoal withdrawn through conveyor 14. The feeding and withdrawal may be by small batches intermittently or by continuous movement.

While my process in its preferred form is particularly adapted for the treatment of hard wood, the principle of my method may be employed when using other kinds of wood or woody materials of equivalent destructive distillation properties. While my process is preferably conducted in the substantial absence of air after the initiating of the reaction, nevertheless small leaks of air may occur without preventing the useful results described above.

Having thus described my invention, what I claim as new and desire to secure by Letters Patent is:

1. The process of distilling wood, which comprises the steps of supplying pieces of wood to a mass of wood in which an exothermic destructive distillation is proceeding, collecting the charcoal in said mass, and passing inert gas successively through said charcoal, mass and pieces, the mass being hotter than the charcoal.

2. The process of distilling wood, which comprises the steps of supplying pieces of wood to a mass of wood in which an exothermic destructive distillation is proceeding, collecting charcoal from said distillation, removing the gases distilled from the mass and passing an uncondensed part of said gases successively through said charcoal, mass, and pieces.

3. The process of distilling wood, which comprises the steps of moving wood through zones in which it is successively heated, destructively distilled substantially out of contact with air, and the charcoal collected, repeatedly circulating uncondensed gases evolved in the distilling zone successively through the heating zone, charcoal collection zone, and distilling zone, said uncondensed gases being mixed with the condensable gases in said distilling zone, but being cooled and condensable gases removed while passing from the heating zone to the charcoal collection zone.

4. The process of distilling wood which comprises the steps of maintaining a mass of wood at a temperature at which an exothermic destructive distillation reaction occurs by heat given off in said reaction, while out of contact with substantial amounts of air, supplying additional wood thereto, and passing an inert gas initially below said temperature, into said mass and through said additional wood.

5. The process of distilling wood, which comprises the steps of maintaining a mass of wood at a temperature at which an exothermic destructive distillation reaction occurs by heat given off in said reaction, while out of contact with substantial amounts of air, supplying additional work thereto, and passing uncondensed gas rich in carbon dioxide initially below said temperature, into said mass, and through said additional wood.

6. The process of distilling wood, which comprises the steps of maintaining a mass of wood at a temperature at which an exothermic destructive distillation reaction occurs by heat given off in said reaction, while out of contact with substantial amounts of air, supplying additional wood thereto, and passing uncondensed gases from said distillation initially below said temperature, into said mass and through said additional wood.

7. The process of distilling wood, which comprises the steps of propagating an exothermic distillation reaction at a temperature below a red heat but above 280° C., through a mass of wood by means of heat given off in said reaction and without introducing substantial amounts of air to said wood, adding wood to said mass as the reaction propagates, removing and partially condensing the gases distilled from the mass and passing an uncondensed part of said gases through said mass and added wood.

8. The process of distilling wood, which comprises the steps of propagating an exothermic distillation reaction through a mass of wood while substantially free from air and during said propagation cooling charcoal formed by the distillation below its air ignition temperature by passing in contact with said charcoal cooled inert gas from said distillation.

9. The process of distilling wood, which comprises the steps of propagating an exothermic distillation reaction through a mass of wood while substantially free from air and during said propagation cooling charcoal formed by the distillation below its air ignition temperature by passing in contact with said charcoal cooled inert gas rich in carbon dioxide from said distillation.

10. The process of distilling wood, which comprises the steps of propagating an exothermic distillation reaction through a mass of wood while substantially free from air and during said propagation cooling charcoal formed by the distillation below its air ignition temperature by passing in contact with said charcoal cooled uncondensed gases from said distillation.

11. The process of distilling wood, which comprises the steps of propagating an exothermic distillation reaction through a mass of wood while substantially free from air and during said propagation cooling charcoal formed by the distillation below its air ignition temperature by passing in contact with said charcoal cooled inert gas from said distillation and finally removing the cooled charcoal to the air.

12. The process of distilling wood, which comprises the steps of propagating an exothermic distillation reaction through a mass of wood while substantially free from air and during said propagation cooling charcoal formed by the distillation below its air ignition temperature by passing in contact with said charcoal cooled inert gas rich in carbon dioxide from said distillation, and finally removing the cooled charcoal to the air.

13. The process of distilling wood, which comprises the steps of propagating an exothermic distillation reaction through a mass of wood while substantially free from air and during said propagation cooling charcoal formed by the distillation below its air ignition temperature by passing in contact with said charcoal cooled uncondensed gases from said distillation, and finally removing the cooled charcoal to the air.

14. The process of distilling wood, which comprises the steps of propagating an exothermic reaction through a mass of wood by heat given off in said reaction while substantially free from air and during said propagation adding wood to the mass, and passing through the mass inert cool gas to control the reaction.

15. The process of distilling wood, which comprises the steps of propagating an exothermic reaction through a mass of wood by heat given off in said reaction while substantially free from air and during said propagation adding wood to the mass, and passing through the mass inert gas rich in carbon dioxide to control the reaction.

16. The process of distilling wood, which comprises the steps of maintaining temperatures in a mass of wood capable of producing an exothermic destructive distillation, after such distillation has been started, by means of the heat liberated in said distillation in the absence of substantial amounts of air, limiting heat losses from the mass to its environment, and modifying said distillation by recirculating through said mass uncondensed gases given off in the distillation.

Signed at Kingsport, Tennessee, this 28th day of April, 1922.

PERLEY S. WILCOX.